(12) United States Patent
Maynard (10) Patent No.: US 10,613,349 B2
(45) Date of Patent: Apr. 7, 2020

(54) CONTACT LENS WIRING (71) Applicant: Spy Eye, LLC, Los Gatos, CA (US)

(72) Inventor: Ronald S. Maynard, Austin, TX (US)

(73) Assignee: Tectus Corporation, Saratoga, CA (US)

( * ) Notice: Subject to any disclaimer, the term of this patent is extended or adjusted under 35 U.S.C. 154(b) by 85 days.

(21) Appl. No.: 15/962,964

(22) Filed: Apr. 25, 2018

(65) Prior Publication Data

US 2018/0316224 A1 Nov. 1, 2018

Related U.S. Application Data (60) Provisional application No. 62/490,581, filed on Apr. 26, 2017.

(51) Int. Cl.
G02C 7/08 (2006.01)
G02C 7/04 (2006.01)
H02J 50/10 (2016.01)
H01F 27/28 (2006.01)
G02C 11/00 (2006.01)
H01F 38/14 (2006.01)

(52) U.S. Cl.
CPC ............ *G02C 7/083* (2013.01); *G02C 7/04* (2013.01); *G02C 7/044* (2013.01); *G02C 11/10* (2013.01); *H01F 27/2823* (2013.01); *H01F 38/14* (2013.01); *H02J 50/10* (2016.02)

(58) Field of Classification Search
CPC .......... G02C 7/083; G02C 7/024; G02C 7/04; G02C 7/044; G02C 7/088; G02C 7/101; G02C 11/10; H02J 50/10; H02J 50/12; H01F 27/28; H01F 27/2823; H01F 38/14

USPC .................................................. 351/159.03
See application file for complete search history.

(56) References Cited

U.S. PATENT DOCUMENTS

| | | | |
|---|---|---|---|
| 5,108,169 A * | 4/1992 | Mandell | G02C 7/021 349/200 |
| 6,031,284 A | 2/2000 | Song | |
| 7,137,952 B2 | 11/2006 | Leonardi et al. | |
| 7,967,439 B2 | 6/2011 | Shelhamer et al. | |
| 8,087,777 B2 | 1/2012 | Rosenthal | |
| 8,786,675 B2 | 7/2014 | Deering | |
| 2011/0288395 A1 * | 11/2011 | Elsheikh | A61B 3/16 600/398 |
| 2012/0140167 A1 * | 6/2012 | Blum | A61F 2/1624 351/159.34 |
| 2016/0081793 A1 | 3/2016 | Galstian et al. | |
| 2016/0093666 A1 | 3/2016 | Gilet et al. | |
| 2017/0255030 A1 * | 9/2017 | Etzkorn | B29D 11/00125 |
| 2018/0043646 A1 * | 2/2018 | Lai | H02J 50/10 |
| 2019/0265515 A1 * | 8/2019 | Lee | G02C 7/083 |
| 2019/0274546 A1 * | 9/2019 | Elsheikh | G01L 9/00 |

* cited by examiner

*Primary Examiner* — Jordan M Schwartz
(74) *Attorney, Agent, or Firm* — Fenwick & West LLP (57) ABSTRACT A contact lens has a first circumferential groove containing a wire coil and an electronics cavity containing one or more electronic devices. The circumferential groove and electronics cavity are formed in a peripheral region of the contact lens. The coil is configured to wirelessly receive electrical power and/or data, and to provide the received power and/or data to the electronic devices in the electronics cavity and to a femtoprojector or other electronic devices in the contact lens.

20 Claims, 10 Drawing Sheets

CONTACT LENS WIRING

CROSS-REFERENCE TO RELATED APPLICATION(S)

This application claims priority under 35 U.S.C. § 119(e) to U.S. Provisional Patent Application Ser. No. 62/490,581, titled "Contact Lens Wiring," filed on Apr. 26, 2017, which is hereby incorporated by reference in its entirety.

BACKGROUND

1. Technical Field

This disclosure relates generally to contact lenses and in particular to contact lenses containing electronic components.

2. Description of Related Art

Contact lenses can include electronic components that provide various capabilities beyond the traditional capabilities of the contact lens. For example, a contact lens can include one or more projectors, such as femtoprojectors, to enable augmented reality functionality. However, electronic components within a contact lens require power to operate. Generally, contact lenses cannot accommodate batteries or other power storage devices of sufficient size to allow the electronic components of the contact lens to operate for an extended amount of time. In addition, real-time data transfer to and from the electronic components of the contact lens can further extend the functionality of the contact lens. These challenges can be addressed in part by wirelessly transferring power and data to the contact lens from an external source. However, the limited form factor of the contact lens makes the inclusion of components to wirelessly receive power and data from the external source challenging.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Contact lenses can include electronic components that perform various functions. For example, a contact lens may contain a sensor device for monitoring glucose concentration in tear fluid or for measuring intraocular pressure. As another example, a contact lens can include one or more femtoprojectors, such as that described by Deering in U.S. Pat. No. 8,786,675, "Systems using eye mounted displays," incorporated herein by reference. A femtoprojector is able to project images onto the wearer's retina, thus superimposing virtual objects onto the field of view of the wearer and enabling the wearer to view an augmented reality.

The electronic components of contact lenses require power to operate. The contact lens can receive power wirelessly by inductively coupling to an external power source via a time varying magnetic field produced by the power source. For instance, the contact lens can include a coil that, when in the presence of the magnetic field, produces a time varying voltage that can be converted into useable power by an onboard power conditioning circuit. Likewise, the coil can be used by a data transceiver circuit onboard the contact lens to wirelessly send and receive data.

In addition to coils and electronic components, the contact lens includes wiring that electronically couples the various components. However, the form factor of the contact lens limits the surface area available to secure these components. Accordingly, the coil(s), electronic components, and corresponding wiring can be embedded within one or more slots formed within the body of the contact lens, preferably outside of optical zone 120. These slots can securely enclose at least part of the components of the contact lens, can aid in manufacturing the contact lens, and can be located outside of the user's field of view.

The coil may be wound into a first slot formed in the peripheral region 122 of the contact lens. The first slot may extend around a circumference of the contact lens, such that a coil wound into the first slot forms a complete loop. Electronic devices can be included in a second slot in the peripheral region 122 of the contact lens. The second slot may be located closer to the center of the contact lens than the first slot, enabling a thinner, larger diameter coil to be wound into the first slot than the second slot. The contact lens can include wiring between the first slot and the second slot, allowing the coil to transfer power and data to and from the electronic components.

Figure 1:
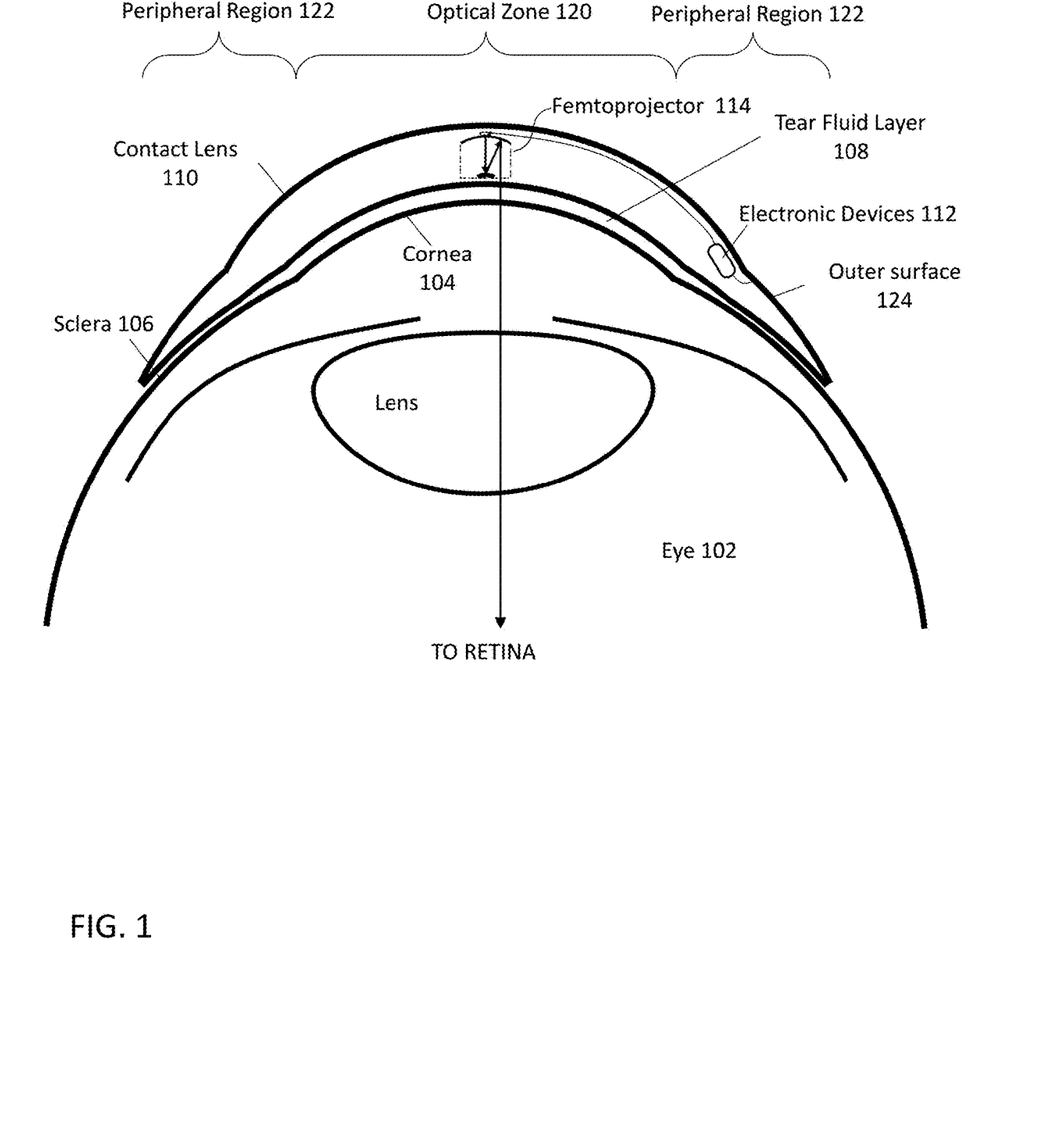
FIG. 1 shows a view of a contact lens mounted on an eye, in accordance with some embodiments.

FIG. 1 shows a cross sectional view of a contact lens 110 mounted on an eye, in accordance with some embodiments. The eye 102 includes a cornea 104 and a sclera 106. In some embodiments, the contact lens 110 is a scleral contact lens designed to contact the sclera 106 and to form a tear fluid layer 108 over the cornea 104. The tear fluid layer 108 may have a thickness of approximately about 10 um to about 200 um over the cornea.

The contact lens 110 contains payload(s) that may include active electronics, such as a femtoprojector 114 located within the optical zone 120 of the contact lens 110 configured to project images onto the wearer's retina, as well as electronic devices 112 located outside the optical zone. Other payloads may include passive devices, such as a coil or antenna for wireless power or data transmission (not shown in the view illustrated in FIG. 1).

The optical zone 120 of the contact lens 110 is the portion through which light incident on the retina of the eye 102 passes. This may be light from the external world that is imaged by the eye onto the retina. It may also be light created by the femtoprojector 114 which is projected onto the retina. The peripheral region 122 is the annular volume circumscribing the optical zone 120. For example, the portion of the contact lens 110 that rests on the sclera 106 is within the peripheral region 122 and outside the optical zone 120, and the wearer's view of the outside world is not affected if that part of the lens is opaque or light-blocking. By mounting electronic devices 112 within the peripheral region 122 of the contact lens 110, the vision of the wearer is not impacted by the electronic devices 112. On the other hand, the center portion of the contact lens 110 is within the optical zone 120. The diameter of the optical zone 120 is typically between about 2 mm to about 8 mm. In addition, the optical zone 120 can be smaller than the cornea 104. As such, portions of the contact lens 110 that are outside the optical zone 120 (e.g., peripheral region 122) may still overlap the cornea 104.

The femtoprojector 114 receives power and data from electronic devices 112 located in the periphery of the lens. The electronic devices 112 are connected to the femtoprojector by wires. Although FIG. 1 shows only one femtoprojector in a contact lens 110, in some embodiments, a contact lens may contain many femtoprojectors.

In some embodiments, the electronic devices 112 may comprise batteries, supercapacitors, photovoltaic cells, mechanical motion harvesters or other power storage and generation devices. In some embodiments, power and data may be transmitted and received by the contact lens 110 from external sources via inductive coupling. For example, the contact lens 110 may comprise a coil (not shown in FIG. 1) electrically connected to the electronic devices 112 configured to receive power and/or data from external sources. For example, voltage can be generated across the coil in response to an external oscillating magnetic field. The electronic devices 112 may include a parallel capacitor connected across the coil to tune it to the magnetic field frequency and increase coupling efficiency as in resonant inductive coupling.

Figure 2:
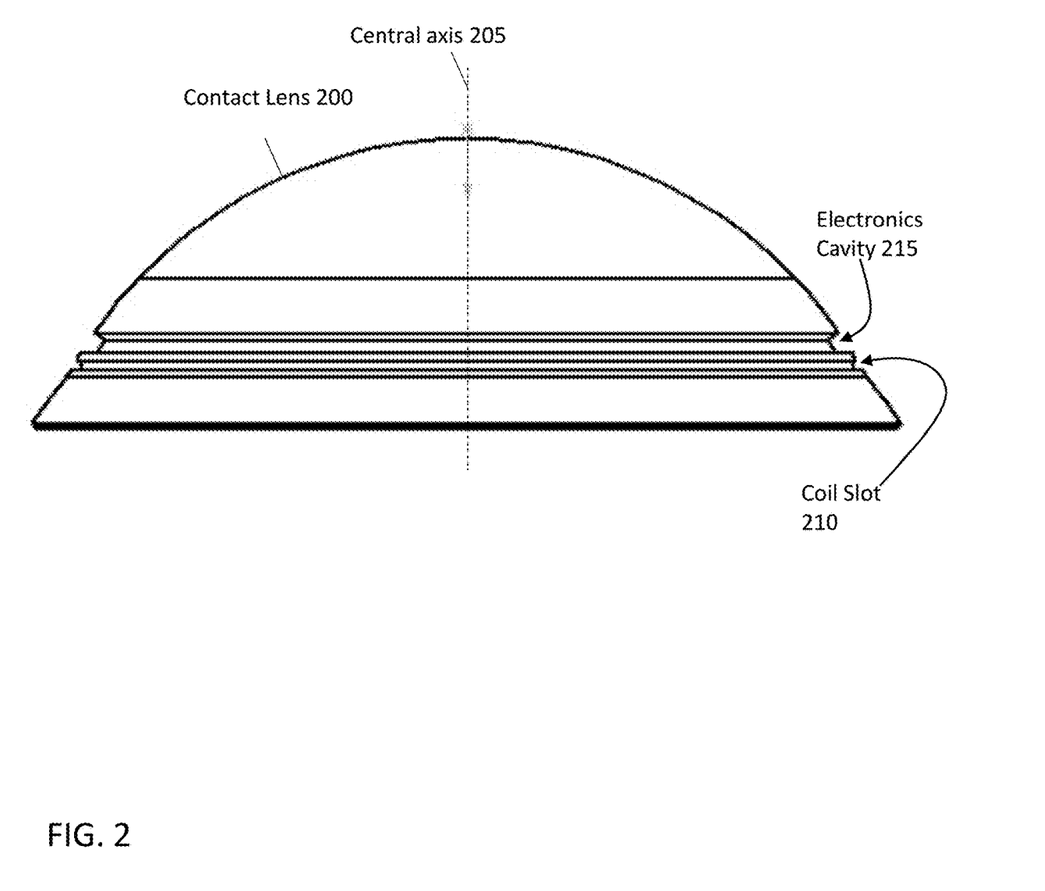
FIG. 2 is a side view of a contact lens having an electronics cavity and a coil slot, in accordance with some embodiments.
Figure 3:
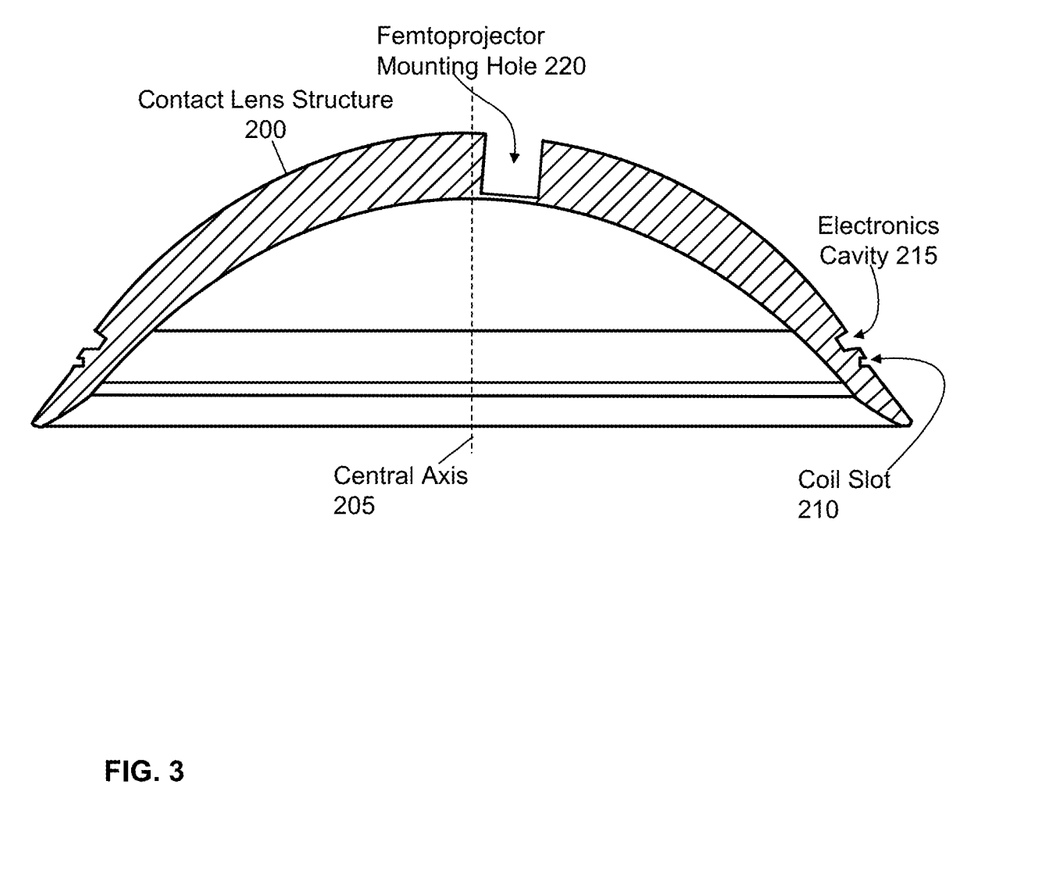
FIG. 3 is a view of a contact lens, in accordance with some embodiments.

In some embodiments, the electronic devices 112 and the coil are mounted on the contact lens 110 via one or more slots formed on an outer surface 124 of the contact lens. FIG. 2 is a side view of a contact lens having an electronics cavity 215 and a coil slot 210, in accordance with some embodiments. FIG. 3 is a view of the contact lens 200 of FIG. 2, in accordance with some embodiments. The contact lens 200 may be similar to the contact lens 110 illustrated in FIG. 1. For example, the contact lens 200 may be a scleral contact lens containing at least one femtoprojector (not shown in FIG. 2) within the optical region, and one or more electronic devices in a periphery peripheral region. In the view illustrated in FIG. 3, the contact lens 200 contains a mounting hole 220 for inserting a femtoprojector. The mounting hole may also be a through hole. While only one mounting hole 220 is shown in FIG. 3, in some embodiments a contact lens may have multiple mounting holes for multiple femtoprojectors.

The contact lens 200 may have a central axis 205. The central axis 205 may correspond to an axis that intersects a center of the contact lens 200 and is substantially normal to the outer surface at the center of the contact lens, such that the contact lens 200 is radially symmetrical about the central axis 205. In some embodiments, the central axis 205 may be characterized as an axis that intersects a center point of the wearer's pupil and the center of the contact lens when the contact lens is worn by the wearer. Although FIGS. 2 and 3 illustrate the contact lens 200 as being circular in shape and centered on the central axis 205, in other embodiments, the contact lens 200 may have a non-circular shape.

As discussed above, in some embodiments, the femtoprojector and electronic devices mounted on the contact lens 200 may receive power and data via a coil based upon inductive coupling with a magnetic field generated by an external source. The electronic devices and coil may be mounted on the contact lens 200 within an electronics cavity 215 and coil slot 210, respectively. The electronic devices may be adhered to the electronics cavity 215 using an adhesive, and the coil may be wound within the coil slot 210 and secured using an adhesive.

As used herein, a "slot" may refer to a groove or indentation formed on an outer surface on a contact lens. In some embodiments, slots may be made in "soft", "hard" or scleral contact lenses by molding or machining. For example, slots may be formed on a rigid gas permeable (RGP) lens structure by turning on a lathe. On the other hand, soft lens structures may be chilled and/or mounted on a mandrel to aid in machining. Ridges may be machined into metal molds to make slots in molded soft lenses. The one or more slots may be formed in a peripheral region of the contact lens, away from the optical zone, such that they do not affect the visual field of the wearer.

In some embodiments, each of the coil slot 210 and the electronics cavity 215 extend around a circumference of the contact lens 200 within a peripheral region of the contact lens 200. For example, each of the coil slot 210 and electronics cavity 215 may define a substantially planar, circular area that is centered on and whose normal is substantially parallel to the central axis 205. In some embodiments, the electronics cavity 215 only extends partially around the circumference of the contact lens 200, while the coil slot 210 extends around the full circumference of the contact lens.

The coil slot 210 and electronics cavity 215 may be formed such that the coil slot 210 is further from central axis 205, and therefore has a larger radius in comparison to the electronics cavity 215. A larger coil radius provides for a larger enclosed area that is more efficient at wirelessly converting a magnetic field into power, and using a magnetic field to wirelessly transmit and receive communications. In addition, increasing the number of conductor turns in a coil can also increase the induced voltage, which is desirable for electronic conditioning. However, since increasing the number of turns will increase the thickness of the coil, there is a compromise of how many turns and how close to the edge of the contact lens 200 a coil can be placed. Because the thickness of the contact lens 200 may decrease closer to its edges (e.g., as illustrated in FIG. 3), for a given coil thickness, the coil slot 210 may be moved outward only until there is a sufficient thickness of material remaining to support the structural integrity of the contact lens. As described below, a coil can be formed by winding multiple loops of wire within the coil slot 210.

The electronics cavity 215 is a slot or opening within the surface of the contact lens in which electronic devices are placed. While FIG. 2 illustrates the contact lens 200 having a coil slot 210 and an electronics cavity 215, as an alternative, a single coil slot may be made large enough to support both a coil and electronic components.

In some embodiments, as illustrated in FIGS. 2 and 3, the coil slot 210 is oriented such that the contact lens central axis 205 is substantially normal to the upper and lower coil slot surfaces, and substantially parallel to the cylindrical axis of the inner slot surface. In such embodiments, the upper edge of the coil slot 210 can catch the wiring as the coil is being wound such that the wiring is less likely to slide up the outer surface of the contact lens 210. As used herein, the "upper" edge of the coil slot may refer to an edge of the coil slot that is closer to the central axis 205 and the center point of the outer surface of the contact lens.

In some embodiments, as illustrated in FIGS. 2 and 3, the electronics cavity 215 may be oriented such that the inner surface is substantially conical in shape, and has a conical axis that is approximately coincident with the contact lens central axis 205, while its upper and lower surfaces are substantially orthogonal to the outer surface 124 of the contact lens 200. In effect, the "floor" of the electronics cavity is approximately parallel to the contact lens surface. This may facilitate placement of electronic devices into the electronics cavity 215 such that the top surfaces of the electronic devices do not protrude from the outer surface of the contact lens 200. As used herein, the term "substantially" may indicate within 10° (e.g., "substantially orthogonal" may correspond to within 10° of orthogonal).

In other embodiments, the floor of the coil slot may be oriented substantially parallel to the surface of the contact lens, while the floor of the electronics cavity may be oriented orthogonal to the central axis 205. In some embodiments, both the coil slot floor and electronics cavity floor may be oriented parallel to the surface of the contact lens or orthogonal to the central axis 205, such that the coil slot floor and electronics cavity floor are substantially parallel with each other, or in any other suitable way. While FIGS. 2 and 3 illustrate the coil slot 210 and electronics cavity 215 as being centered on the central axis 205, in other embodiments, the coil slot 210 and electronics cavity 215 are not centered on the central axis 205.

In some embodiments, the electronic devices may include one or more power management devices (or "power circuits") configured to manage the conversion of voltage across the coil into power for the contact lens. For example, the electronic devices may include a parallel capacitor connected to the coil configured to increase a coupling efficiency of the coil and/or one or more rectifiers configured to rectify AC power received via the coil into DC power. In some embodiments, the electronic devices may include a transceiver component (or "data circuit") configured to receive or transmit data via the coil. For example, in some embodiments, the coil is configured to receive power and data multiplexed as part of an oscillating magnetic field generated by an external source. The transceiver component may extract data from a signal generated in the coil by the received field, and may transmit data using the oscillating field as a carrier wave. In other embodiments, the transceiver may be able to transmit or receive data via a separate channel from the coil. The electronic devices may further comprise one or more components for processing received data to be used by the femtoprojector for projecting image light (e.g., a buffer, a video driver, etc.), one or more sensors (e.g., gyroscopic sensors, optical sensors, thermal sensors, etc.), and/or the like.

Figure 4:
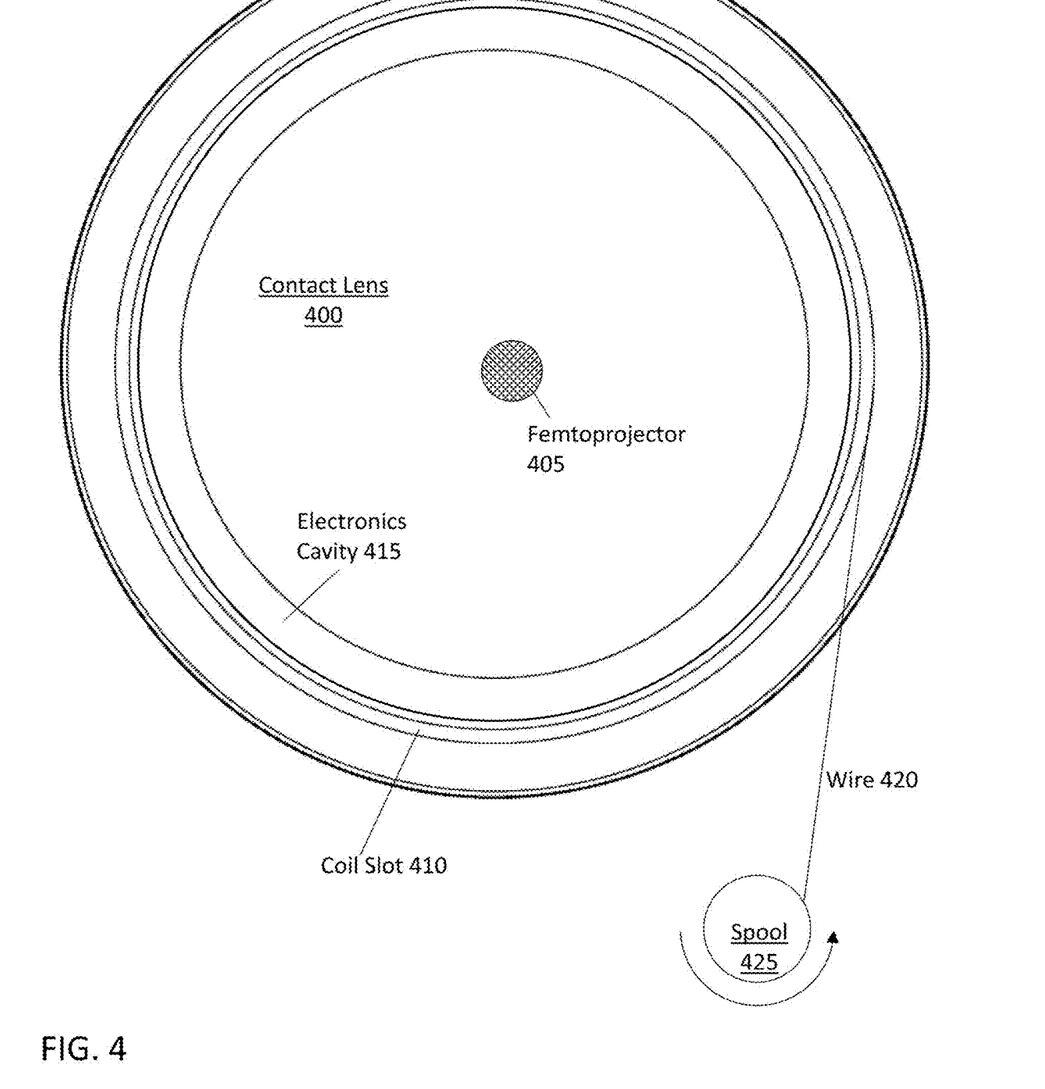
FIG. 4 is a top view of a contact lens having an electronics cavity, a coil slot and a femtoprojector, in accordance with some embodiments.

FIG. 4 is a top view of a contact lens having an electronics cavity, a coil slot and a femtoprojector, in accordance with some embodiments. The contact lens includes an embedded femtoprojector 405, a coil slot 410, and an electronics cavity 415. The coil slot 410 and electronics cavity 415 may be substantially concentric, and may extend around the circumference of the contact lens 400.

In some embodiments, a coil is wound into the coil slot 410 by winding a length of wire 420 from a spool 425 into the coil slot 410. In some embodiments, the spool 425 is equipped with a controlled drag mechanism in order to maintain a constant tension on the wire 420 as it is wound into the coil slot 410. The wire 420 may be as thin as about 10 μm or less in diameter, or as thick as about 100 μm or more in diameter. The drag mechanism of the spool 425 provides a consistent wire packing force, helping to ensure that the wire 420 does not break during winding. By winding the wire 420 into the coil slot 410 using the spool 425, the coil can be tightly wound within the coil slot 410 and securely attached to the contact lens 400, even without the use an adhesive or other binding material. In contrast, pre-formed coils may require adhesive in order to attach the coils to a contact lens 400.

Figures 5A, 5B:
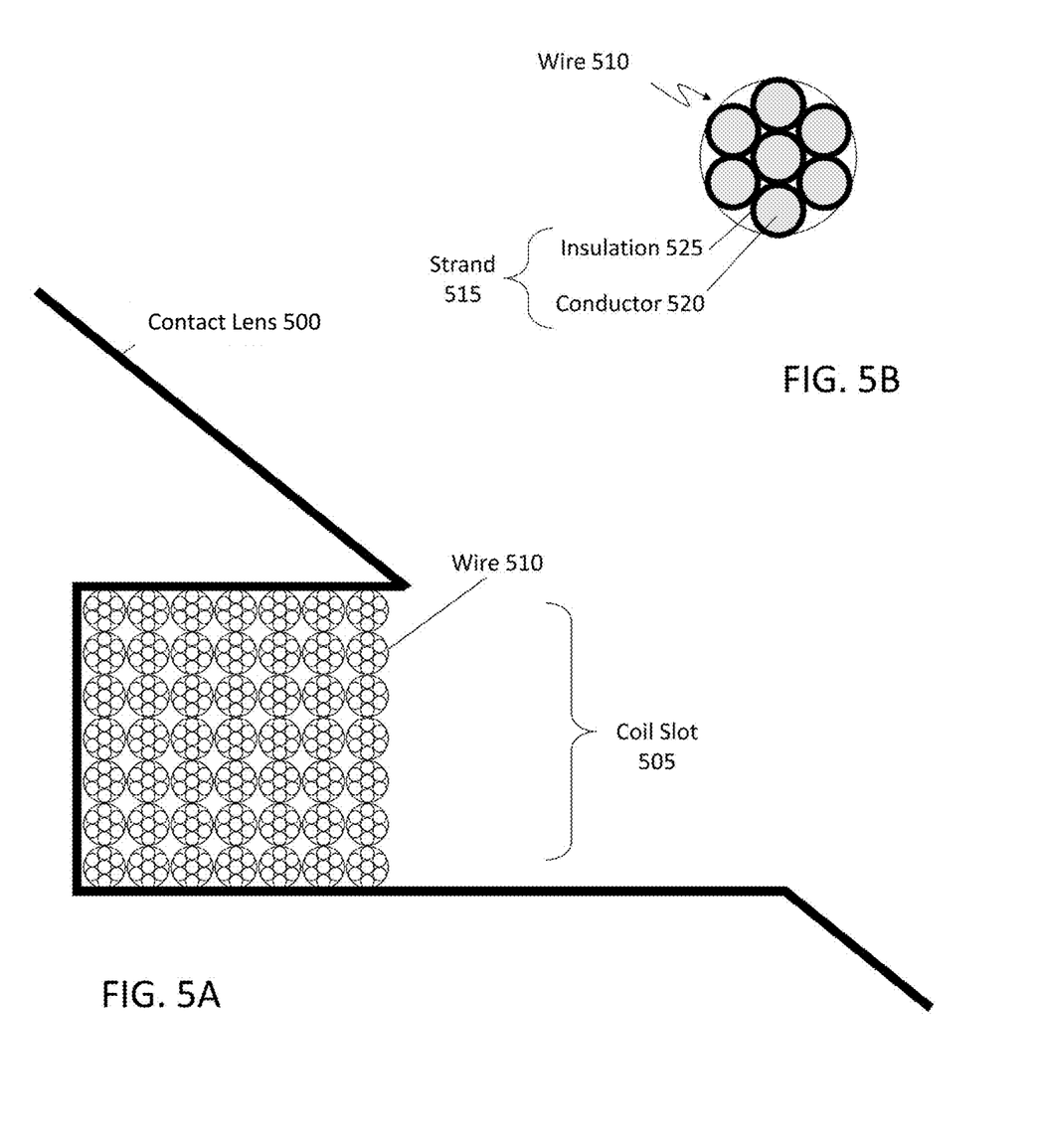
FIG. 5A is a view of a wire wound in a coil slot of a contact lens, in accordance in some embodiments.
FIG. 5B illustrates a view of the seven-strand wire in FIG. 5A.

Different types of wires may wound into the coil slot of a contact lens in different ways. FIG. 5A is a view of a wire wound in a coil slot of a contact lens, in accordance in some embodiments. As illustrated in FIG. 5A, the wire 510 wound into the coil slot 505 of the contact lens 500 may be a multi-strand wire (e.g., a seven-strand wire).

FIG. 5B illustrates a view of the seven-strand wire 510 in FIG. 5A. Each strand 515 of the seven-strand wire 510 is an insulated conductor (e.g., a conductor 520 surrounded by insulation 525). The conductors 520 of the strands 515 are not in immediate electrical contact with one another, and the wire 510 is thus divided into multiple electrically parallel conductors. This reduces potential alternating current (AC) crowding effects, skin effects, and proximity effects that can change the resistance of a coil as a function of frequency. The diameters of the strands 515 may be configured to be commensurate with the skin depth associated with the skin effect at high frequency. Each strand within a cross-section of a wire illustrated in FIG. 5A may be electrically connected to a corresponding strand within one or more other cross-sections of wires illustrated in FIG. 5A. The strands 515 may be electrically connected to one another at the beginning and end of the coil.

As illustrated in FIG. 5B, for a given cross-section of the wire 510, one or more of the strands 515 are adjacent to an outer surface of the wire 510, and at least one strand is located at the center of the wire 510. In embodiments where the wire 510 comprises more than seven strands 515, different strands may be at different locations in the wire relative the center and outer surface of the wire. In order to further reduce an amount of resistance of the wire 510 that may be caused by the skin effect and proximity effect, the strands 515 may be woven or braided such that their relative positions, within a length of wire 510, vary uniformly from the center to the outer surface. Or equivalently, the strands 515 may be braided such that each strand shares the surface position equally with every other strand for a given length of wire 510.

Referring back to FIG. 5A, the wire 510 may be wound into the coil slot 505 to form a coil having a plurality of windings. The windings may be wound in a horizontal direction, a vertical direction, or a combination thereof. For example, in some embodiments, the wire 510 is wound one or more times horizontally (e.g., in a direction progressively distant from the central axis of the contact lens 500), and then wound vertically (e.g., in a direction parallel with the central axis). In other embodiments, the wire 510 is first wound vertically around the contact lens (e.g., down the inside surface of the coil slot 505 that is parallel with the central axis) and then horizontally (e.g., over the coils previously wound on the inside surface of the coil slot 505). The embodiments illustrated herein shown 7-stranded wires being wound 49 times around the contact lens, though in other embodiments, wires can include any number of strands and can be wound any number of times around the contact lens, for instance creating up to 2500 windings or more. In addition, although FIG. 5A illustrates the windings of the wire 510 forming a rectangular array of windings, forming aligned rows and columns, in other embodiments, each row or column of windings may be staggered relative to an adjacent row or column.

Figures 6A, 6B:
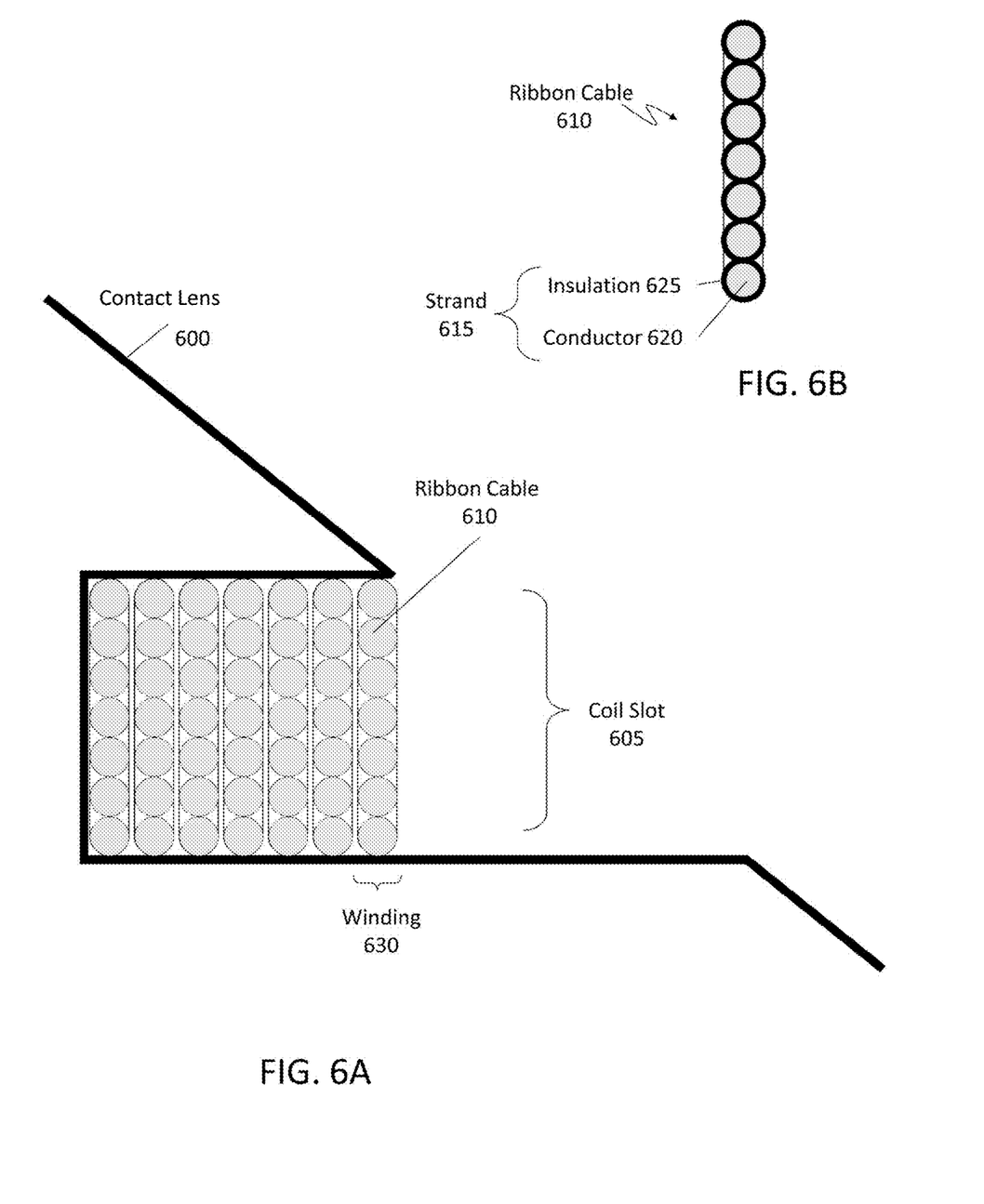
FIG. 6A is a view of ribbon cable wound in a coil slot, in accordance with some embodiments.
FIG. 6B illustrates a view of the ribbon cable 610 illustrated in FIG. 6A.

In some embodiments, the wire wound in the coil slot may comprise a ribbon cable. FIG. 6A is a view of ribbon cable wound in a coil slot, in accordance with some embodiments. As illustrated in FIG. 6A, the wire wound in the coil slot 605 of the contact lens 600 is a ribbon cable 610 having a plurality of strands 615.

FIG. 6B illustrates a view of the ribbon cable 610 illustrated in FIG. 6A. Each strand 615 of wire in the ribbon cable is an insulated conductor (e.g., a conductor 620 surrounded by insulation 625). As such, each strand 615 is not in immediate electrical contact with the other strands of the ribbon cable 610. Dividing the wire into electrically parallel conductors reduces high frequency AC current crowding effects, skin effects and proximity effects that cause the electrical resistance of a coil to have a frequency dependence. In some embodiments, the ribbon cable 610 is wound around the coil slot 605 multiple times such that each strand 615 within a first ribbon cable cross-section illustrated in FIG. 6A is electrically connected to a corresponding strand 615 within each other ribbon cable cross-section. In some embodiments, the conductors in the ribbon cable 610 are electrically connected to one another at either end of the ribbon cable 610 before it is wound into coil slot 605. For the geometry shown in FIG. 6A, this would effectively form a vertical stack of seven independent coils, each with windings spiraling away from central axis 205, that are electrically connected in parallel. In some embodiments, each strand 615 of the ribbon cable 610 may be a multistrand wire (such as the wire 510 illustrated in FIG. 5B).

In some embodiments, the ribbon cable 610 may be wound into the coil slot 605 in a horizontal direction (e.g., in a direction orthogonal to the central axis, with each successive winding moving further away from the central axis 205) or in a vertical direction (e.g., in a direction parallel to the central axis). For example, FIG. 6A illustrates the ribbon cable 610 wound in a horizontal direction. As such, the coil formed by the wound ribbon cable 610 comprises a plurality of windings 630, each having a different radius from the central axis. However, each strand 615 within a given winding 630 will have the same radius from the central axis. In some embodiments, a coil formed by winding the ribbon cable 610 in a horizontal direction may be referred to as a "disk coil."

In other embodiments, the ribbon cable 610 may be wound in a vertical direction, resulting in each strand 615, within a winding 630, having a fixed radius of curvature with respect to the central axis, as it spirals upwards. However, each strand in the ribbon cable 610 will have a different radius from the central axis. A coil formed by winding the ribbon cable 610 in a vertical direction will produce multiple, nested cylindrical coils of varying radii and may be referred to as a "cylindrical coil." In some embodiments, winding the ribbon cable 610 horizontally (e.g., to form a disk coil instead of a cylindrical coil) may allow for the ribbon cable 610 to be wound tighter in the coil slot 605 in comparison to winding vertically. In some embodiments, winding a ribbon cable vertically to form a cylindrical coil may require a spiral preform of the cable before inserting into the coil slot.

In some embodiments, a contact lens configured to operate at 13.56 MHz (e.g., receive power and/or data via a magnetic field oscillating at 13.56 MHz) may have a coil with 8turns of wire, each consisting of 128 insulated strands of 58 gauge (10 um diameter) wire. In some embodiments, the coil may have about 1 turn to about 20 turns. Due to the limited space available on the contact lens, there may be a tradeoff between turns in the coil and the number of strands in the wire. Fewer turns permit more strands, while more turns leaves room for fewer strands.

Figure 7:
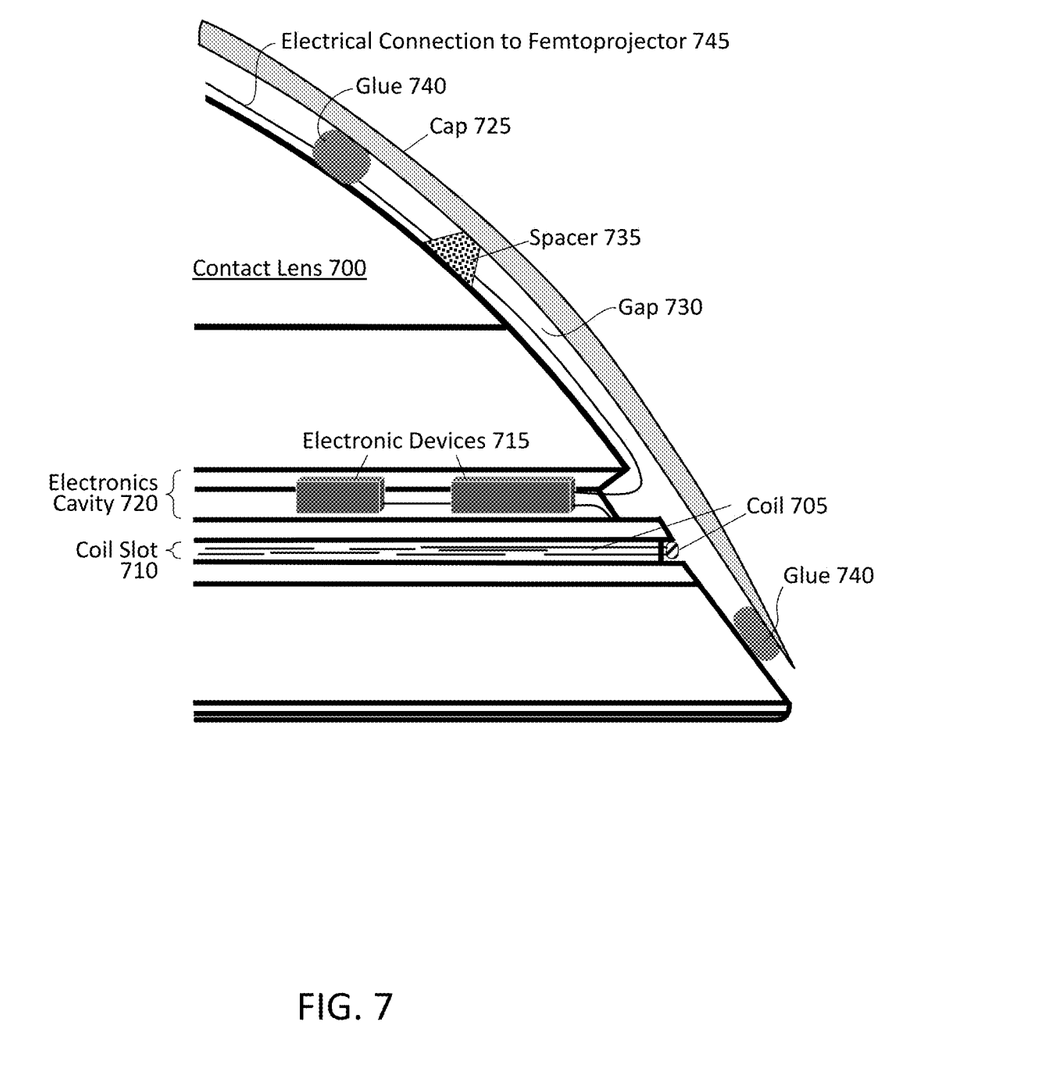
FIG. 7 is a view of part of a contact lens having an electronics cavity and a coil slot, in accordance with some embodiments.

In some embodiments, a cap is formed over the outer surface of the contact lens, in order to protect the coil and electronic devices from the biological environment, and the biological environment from the electronic components, currents and construction materials. FIG. 7 is a view of part of a contact lens having an electronics cavity and a coil slot, in accordance with some embodiments. The contact lens 700 has a coil 705 of wire wound in the coil slot 710 and electronic devices 715 in the electronics cavity 720. A thin cap 725 is placed over the outer surface of the contact lens 700. In some embodiments, the cap 725 covers a sufficient portion of the outer surface of the contact lens 700 such that it encapsulates the wire coil 705 and electronic devices 715, protecting them from exposure to tear fluid, dust, and other material within the eyeball environment. The cap 725 may be made from the same material as the contact lens (e.g. RGP or silicone) or a different material.

In some embodiments, the cap 725 is overlaid directly on the outer surface of the contact lens 700. In other embodiments, such as that illustrated in FIG. 7, the cap 725 is separated from the outer surface of the contact lens 700 by a gap distance, forming a gap 730 between the contact lens and the cap 725. The gap distance separating an inner surface of the cap 725 and the outer surface of the contact lens 700 may be maintained by one or more spacers 735. The spacers 735 may be formed as part of the contact lens 700, part of the cap 725, or both, or they may be independent structures placed between the contact lens 700 and the cap 725 during assembly. In some embodiments, wiring on the surface of the contact lens 700 may serve as a spacer defining the gap distance. For example, in some embodiments, one or more wires or other electrical connections may run over the outer surface of the contact lens 700 (e.g., an electrical connection 745 connecting the electronic devices 715 in the electronics cavity 720 with a femtoprojector located within the optical zone 120 of the contact lens 700), the thickness of the wires functioning as spacers separating the cap 725 from the contact lens 700.

In some embodiments, the gap 730 between the contact lens 700 and the cap 725 is completely filled with a filler material, such as glue. In other embodiments, the cap 725 is glued only to the contact lens 700 in certain areas (e.g., illustrated in FIG. 7 as glue portions 740), with a remaining portion of the gap space filled with air or an inert gas. In some embodiments, a ring of glue 740 extending around a circumference on the outer surface of the contact lens 700 is formed that prevents any moisture from reaching the electronics cavity 720 or the coil slot 710. The glue 740 may be a medical grade optical adhesive.

The electronic devices 715 may have multiple electrical connections between them. For example, in some embodiments a serial or parallel bus may be located in the electronics cavity 720 connecting one or more of the electronic devices 715. In some embodiments, electrical connections between the electronic devices 715 and one or more components outside the electronics cavity 720 (e.g., a femtoprojector) may be made by wires located in the gap between the contact lens 700 and the cap 725 (e.g., the electrical connection 745). In some embodiments, the electrical connection 745 may include other kinds of conductors such as flexible printed circuits, silver epoxy, sputtered metals, electroplated conductors, and the like.

In order for the electronic devices within the electronics cavity on a contact lens to receive power and data from the coil wound within the coil slot, the electronic devices may need to be electrically connected to the coil (e.g., with wiring, conductive traces, and the like). In some embodiments, the electronic devices and coil are connected via one or more wires arranged over the outer surface of the contact lens between the coil slot and electronic tray.

Figure 8:
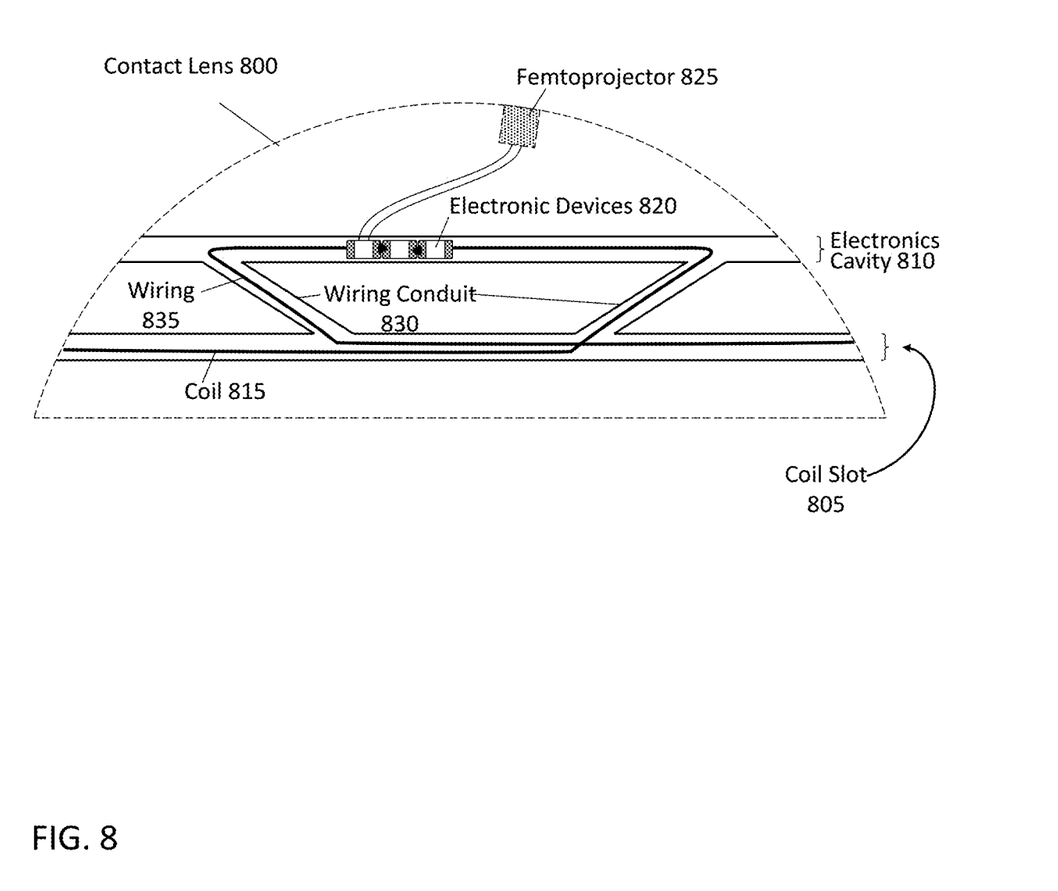
FIG. 8 is an illustration of wiring in a contact lens, in accordance with some embodiments.

In some embodiments, one or more additional grooves or other features are formed on the contact lens in order to accommodate wires connecting the coil and electronic devices. FIG. 8 is an illustration of wiring in a contact lens, in accordance with some embodiments. The contact lens 800 contains a coil slot 805 and an electronics cavity 810 formed on the outer surface of the contact lens 800. The coil slot 805 and electronics cavity 810 may be similar to the coil slot and electronics cavity described above. The coil slot 805 contains a coil 815 wound within the coil slot 805. One or more electronic devices 820 are mounted within the electronics cavity 810. The contact lens 800 may further contain one or more femtoprojectors 825 located within the optical zone 120 of the contact lens 800. The size and position of the coil slot 805 and electronics cavity 810 as illustrated in FIG. 8 are not to scale or order with respect to the contact lens.

The contact lens 800 further includes one or more wiring conduits 830 connecting the coil slot 805 and electronics cavity 810. The wiring conduits 830 enclose wiring 835 or other electronical connections running between the coil slot 805 and the electronics cavity 810. The wiring conduits 830 may be slots in the outer surface of the contact lens 800, analogous to the electronics cavity 810 and the coil slot 805. Alternatively, the wiring conduits 830 may be enclosed shafts inside the contact lens 800. Because the electronics cavity 810 and coil slot 805 are formed in the peripheral regions of the contact lens 800 (i.e., outside the optical zone), the wiring conduits 830 and wiring 835 will also be outside the optical zone, and will have no effect on the visual field of the wearer. The wiring 835 may also reside on the surface of the contact lens, without the aid of wiring conduits 830, in order to electrically connect the contents of electronics cavity 810 and coil slot 805. In some embodiments, the wiring 835 may comprise the same wires used to wind the coil 815 within the coil slot 805. In other embodiments, the wiring 835 may comprise different wires.

As illustrated in FIG. 8, the contact lens 800 may have additional wiring or electronic circuits for carrying power and data from electronic devices 820 in the electronics cavity 810 to one or more femtoprojectors 825. In some embodiments, the additional wiring or electrical circuits may be semi-optically transparent, in order to reduce effects on the visual field of the wearer.

Figure 9:
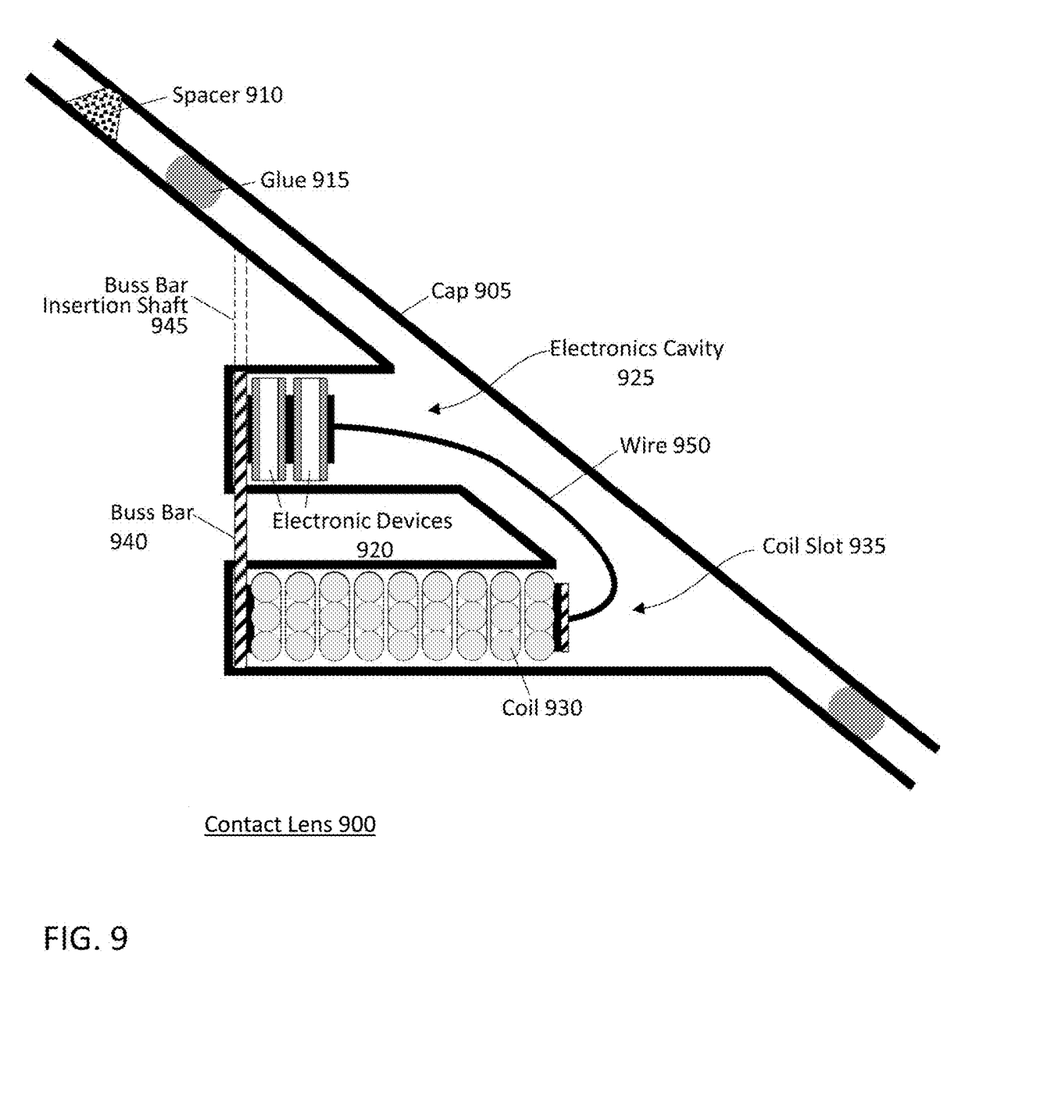
FIG. 9 is another illustration of wiring in a contact lens, in accordance with some embodiments.

FIG. 9 is another illustration of wiring in a contact lens, in accordance with some embodiments. FIG. 9 shows an alternative arrangement for wiring between the coil slot and the electronics cavity using a buss bar 940. As illustrated in FIG. 9, the contact lens 900 is covered by a cap 905. The cap 905 may be separated from the outer surface of the contact lens 900 by one or more spacers 910 and glue 915, and may function to seal the electronic devices 920 within the electronics cavity 925 and the coil 930 within the coil slot 935 from the outside environment, protecting the electronic devices 920 and coil 930 from dust, moisture, etc. The cap 905 also serves to isolate the components, chemicals, and construction materials of the contact lens from the outside environment.

As illustrated in FIG. 9, the coil 930 may be wound from a three strand ribbon cable to form a stack of three horizontally wound disc coils within coil slot 935. As such, each disc coil may have an inner winding closer to the central axis of the contact lens 900, and an outer winding near the outer surface of the contact lens 900.

A buss bar insertion shaft 945 is included within the contact lens 900 that connects the electronics cavity 925 with the coil slot 935. Although FIG. 9 illustrates the inner surfaces (those surfaces closest to the central axis) of the electronics cavity 925 and coil slot 935 as being substantially aligned and parallel with one another, in other embodiments, the inner surfaces may not be aligned or parallel. For example, as discussed above, in some embodiments the inner surface normal of coil slot 935 is formed to be substantially orthogonal to the central axis of the contact lens, while the electronics cavity inner surface normal is formed to be substantially parallel to the outer surface normal of the contact lens at every point. As such, the inner surface of the coil slot may be defined by a cylinder circumscribed about the central axis, while the inner surface of the electronics cavity may be thought of as parallel to and just below the outer surface.

The buss bar insertion shaft 945 may be a substantially straight shaft that intersects both the electronics cavity 925 and the coil slot 935. In some embodiments, the buss bar insertion shaft 945 comprises an enclosed shaft formed by drilling a hole within the outer surface of the contact lens 900 in a direction that intersects both the electronics cavity 925 and coil slot 935. In other embodiments, the buss bar insertion shaft 945 is a slot formed into the outer surface of the contact lens 900 adjacent to both the electronics cavity 925 and coil slot 935.

A buss bar 940 inserted into the contact lens 900 via a buss bar insertion shaft 945 is able to electrically couple the electronics cavity 925 to the coil slot 935. The buss bar 940 may be a stiff wire or conductive strip inserted via the shaft 945. The buss bar 940 electrically connects a first terminal of the electronic devices 920 within the electronics cavity 925 with one side of the coil 930 (e.g., an inner winding of the coil 930). In addition, a second terminal of the electronic devices 920 may be connected to the other side of the coil 930 (e.g., an outer winding of the coil 930) by a wire 950. As such, both ends of the coil 930 can be electrically connected to the electronic devices 920. For example, the coil 930 as illustrated in FIG. 9 comprises nine windings of a three-conductor ribbon cable. The conductors of the ribbon cable are bonded to the buss bar 940 at one end and to the wire 950 at the other end. The use of the buss bar 940 thus allows for the coil 930 to be more conveniently wound such that one end of the coil 930 is wound near an inner surface of the coil slot 935, and is bonded there to buss bar 940, thereby providing electrical communication to the inner surface of electronic cavity 925. Similarly, the electronic devices 920 may contain terminals near the inner surface of the electronics cavity 925 that may be difficult to connect with the wire 950 but that can be electrically connected to the buss bar 940.

Figure 10:
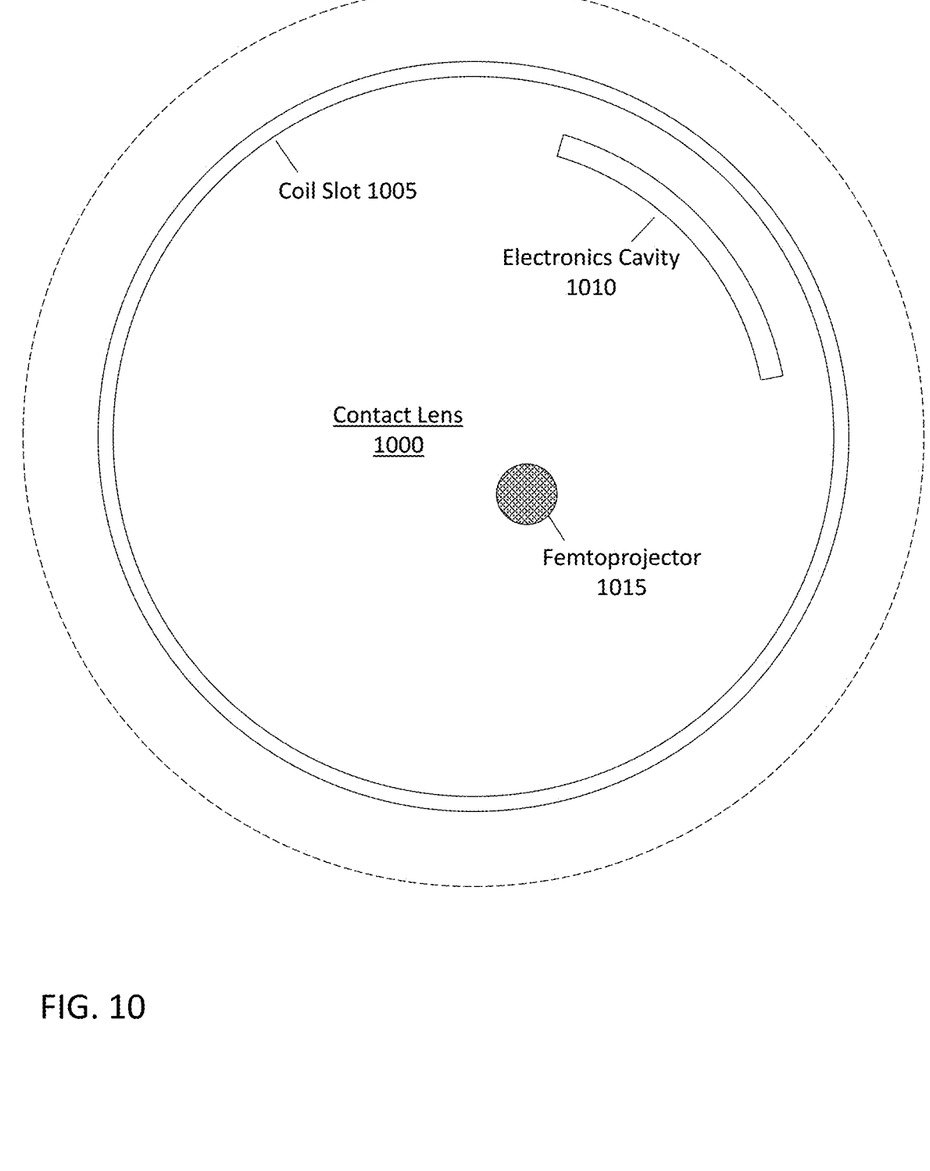
FIG. 10 is an illustration of a contact lens with an electronics cavity that extends only part way around the periphery of the lens, in accordance with some embodiments.

While the above figures illustrate both the coil slot and the electronics cavity extending around the entire circumference of the contact lens, in some embodiments, the electronics cavity may only extend partway around the circumference of the contact lens. For example, FIG. 10 is an illustration of a contact lens with an electronics cavity that extends only part way around the periphery of the lens, in accordance with some embodiments. The contact lens 1000 of FIG. 10 contains a coil slot 1005, an electronics cavity 1010, and a femtoprojector 1015. While the coil slot 1005 extends around the entire circumference of the contact lens 1000 in order to accommodate the windings of a coil, the electronics cavity 1010 needs only be long enough to hold necessary electronic devices used by the contact lens 1000, and thus does not need to extend around the entire circumference of the contact lens 1000. In some embodiments, the electronics cavity 1010 is configured to have a size sufficient such that the electronic devices placed within the electronics cavity 1010 may be spread apart enough to allow for sufficient heat dissipation.

Winding a wire coil in a coil slot in a contact lens allows for the coil to be securely attached to the contact lens. The coil slot is formed in the peripheral region of the contact lens, maximizing an amount of area covered by the coil, thus increasing an amount of power and data that can be received and transmitted. In addition, electronic devices may be mounted in an electronics cavity in the contact lens, and electrically connected to the coil to receive power and data.

Although the detailed description contains many specifics, these should not be construed as limiting the scope of the invention but merely as illustrating different examples. It should be appreciated that the scope of the disclosure includes other embodiments not discussed in detail above. For example, in some embodiments, a contact lens may be non-circular in shape (e.g., oval). In some embodiments, the coil and coil slot may not be centered on the central axis. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A contact lens, comprising:
    a contact lens substrate, the contact lens substrate comprising a circumferential groove and an electronics cavity separate from the circumferential groove formed within an outer surface of the contact lens substrate, wherein the circumferential groove is formed to have an inner surface connected to the outer surface of the contact lens substrate by upper and lower connecting surfaces, at least one of the upper and lower connecting surfaces being oriented substantially orthogonal to a central axis of the contact lens substrate, and the inner surface oriented substantially parallel to the central axis;
    a wire coil wound circumferentially around the contact lens substrate within the circumferential groove;
    one or more electronic devices included within the electronics cavity; and
    an electrical conduit connecting the wire coil with the one or more electronic devices.

2. The contact lens of claim 1, wherein the electronics cavity is formed to have an inner surface connected to the outer surface of the contact lens substrate by upper and lower connecting surfaces, one of the upper and lower connecting surfaces being oriented substantially orthogonal to the outer surface of the contact lens substrate.

3. The contact lens of claim 1, wherein the electronics cavity is substantially parallel to the circumferential groove, and wherein the electronics cavity is closer to a center of the contact lens substrate than the circumferential groove.

4. The contact lens of claim 1, wherein the electronics cavity does not extend around the entire circumference of the contact lens substrate.

5. The contact lens of claim 1, further comprising a cap covering a surface of the contact lens substrate and encapsulating the wire coil within the circumferential groove and one or more electronic devices within the electronics cavity.

6. The contact lens of claim 5, wherein the cap comprises a gas-permeable material.

7. The contact lens of claim 5, wherein the cap is coupled to the contact lens substrate using an optically-transparent adhesive.

8. The contact lens of claim 5, wherein the cap is separated from the surface of the contact lens substrate by one or more spacers.

9. The contact lens of claim 1, wherein the wire coil comprises a ribbon cable having a plurality of insulated parallel wires.

10. The contact lens of claim 9, wherein the wire coil is wound as a disk coil comprising windings stacked in a direction substantially orthogonal to a central axis of the contact lens substrate.

11. The contact lens of claim 1, wherein the wire coil comprises a braided cable having a plurality of insulated wires.

12. The contact lens of claim 1, wherein the wire coil is configured to inductively couple to an external power source via a magnetic field generated by the external source.

13. The contact lens of claim 12, wherein the one or more electronic devices includes a power circuit configured to convert current within the wire coil from the magnetic field into power for one or more remaining electronic devices of the one or more electronic devices.

14. The contact lens of claim 13, wherein the power circuit comprises at least a rectifier circuit.

15. The contact lens of claim 1, further comprising a femtoprojector embedded within the contact lens substrate.

16. The contact lens of claim 15, wherein the femtoprojector is coupled to the one or more electronic devices via a second electrical conduit.

17. The contact lens of claim 16, wherein the one or more electronic devices are configured to provide power and data received via the wire coil to the femtoprojector.

18. The contact lens of claim 1, further comprising a bus cavity within an outer surface of the contact lens substrate connecting the electronics cavity with an inner surface of the circumferential groove, wherein the electrical conduit is located within the bus cavity.

19. An apparatus, comprising:

a contact lens comprising a circumferential groove within an outer surface of the contact lens;

a wire coil located within the circumferential groove;

a plurality of electronic devices coupled to or embedded within the contact lens, the plurality of electronic devices including at least one femtoprojector and one or more remaining electronic devices;

and a first electrical connection connecting the wire coil with the one or more remaining electronic devices, and a second electrical connection coupling the femtoprojector to the one or more remaining electronic devices, wherein the one or more remaining electronic devices are configured to provide power and data received via the wire coil to the femtoprojector.

20. A contact lens, comprising:

a contact lens substrate, the contact lens substrate comprising a circumferential groove and an electronics cavity within an outer surface of the contact lens substrate;

a wire coil wound circumferentially around the contact lens substrate within the circumferential groove;

one or more electronic devices included within the electronics cavity;

a femtoprojector embedded within the contact lens substrate; and a first electrical connection connecting the wire coil with the one or more electronic devices, and a second electrical connection coupling the femtoprojector to the one or more electronic devices, wherein the one or more electronic devices are configured to provide power and data received via the wire coil to the femtoprojector.

* * * * *